United States Patent
Kareenahalli et al.

(10) Patent No.: US 7,058,752 B2
(45) Date of Patent: Jun. 6, 2006

(54) HARDWARE DETECTED COMMAND-PER-CLOCK

(75) Inventors: Suryaprasad Kareenahalli, Folsom, CA (US); Zohar B. Bogin, Folsom, CA (US); Anoop Mukker, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 10/749,183

(22) Filed: Dec. 30, 2003

(65) Prior Publication Data

US 2005/0144374 A1 Jun. 30, 2005

(51) Int. Cl.
*G06F 12/00* (2006.01)

(52) U.S. Cl. .............. 711/100; 711/154; 345/531; 345/566

(58) Field of Classification Search ........ 711/100, 711/154, 211; 345/530–574; 714/702
See application file for complete search history.

(56) References Cited

U.S. PATENT DOCUMENTS 6,260,121 B1 * 7/2001 Jeddeloh ............... 711/154
6,442,645 B1 * 8/2002 Freker ................. 711/105
6,714,463 B1 * 3/2004 Han et al. ............. 365/191

OTHER PUBLICATIONS

Intel Corporation, "Intel® 845G/845GL/845GV Chipset: Intel® 82845G/82845GL/82845GV Graphics and Memory Controller Hub (GMCH)", Product Datasheet, Document No. 290746-002, Sections 1.3, 1.4.2 and 2.2.1 (Oct. 2002).

* cited by examiner

*Primary Examiner*—Nasser Moazzami
(74) *Attorney, Agent, or Firm*—Blakely, Sokoloff, Taylor & Zafman LLP

(57) ABSTRACT

A memory controller is coupled to a memory device via a memory channel. The memory controller includes a command-per-clock detection unit that compares a portion of a current address with a portion of a previous address. If there is a match, then the memory controller can continue to assert a chip select line coupled to the memory device. The command-per-clock detection unit checks to see whether only certain low-order bits of the address lines are toggling between the current and previous addresses. Additional copies of address lines for particular low-order bits are provided to the memory device to reduce loading on the low order bit address lines, allowing the low order bit address lines to toggle quickly in order to avoid the necessity of inserting a one clock period wait state. If the command-per-clock detection unit does not find a match (meaning that more than the low order address bits are toggling) then the wait state is inserted by deasserting the chip select line for a clock period.

13 Claims, 3 Drawing Sheets

HARDWARE DETECTED COMMAND-PER-CLOCK

FIELD OF THE INVENTION

The present invention pertains to the field of computer systems. More particularly, this invention pertains to the field of memory interface optimization.

BACKGROUND OF THE INVENTION

Memory subsystem performance is an important factor in the overall performance of computer systems. This may be particularly true in computer systems that integrate a graphics controller in a component along with a memory controller. The graphics device accesses graphics memory located within system memory through the memory controller.

The graphics controller may issue 32 Byte "stride cycles" to the memory controller. This type of cycle may be defined as 32 Byte read requests whose two 16 Byte addresses are offset by plus or minus 128 Bytes (or 256 Bytes) instead of a usual offset of 16 Bytes. Also, these stride cycles are typically sequenced with another stride cycle which is either 16 Bytes of 32 Bytes apart from the previous cycle. In prior computer systems using double data rate (DDR) memory, the two stride cycles are separated by a wait state of one clock period.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, a memory controller is coupled to a memory device via a memory channel. The memory controller includes a command-per-clock detection unit that compares a portion of a current address with a portion of a previous address. If there is a match, then the memory controller can continue to assert a chip select line coupled to the memory device. The command-per-clock detection unit checks to see whether only certain low-order bits of the address lines are toggling between the current and previous addresses. Additional copies of address lines for particular low-order bits are provided to the memory device to reduce loading on the low order bit address lines, allowing the low order bit address lines to toggle quickly in order to avoid the necessity of inserting a one clock period wait state. If the command-per-clock detection unit does not find a match (meaning that more than the low order address bits are toggling) then the wait state is inserted by deasserting the chip select line for a clock period.

Figure 1:
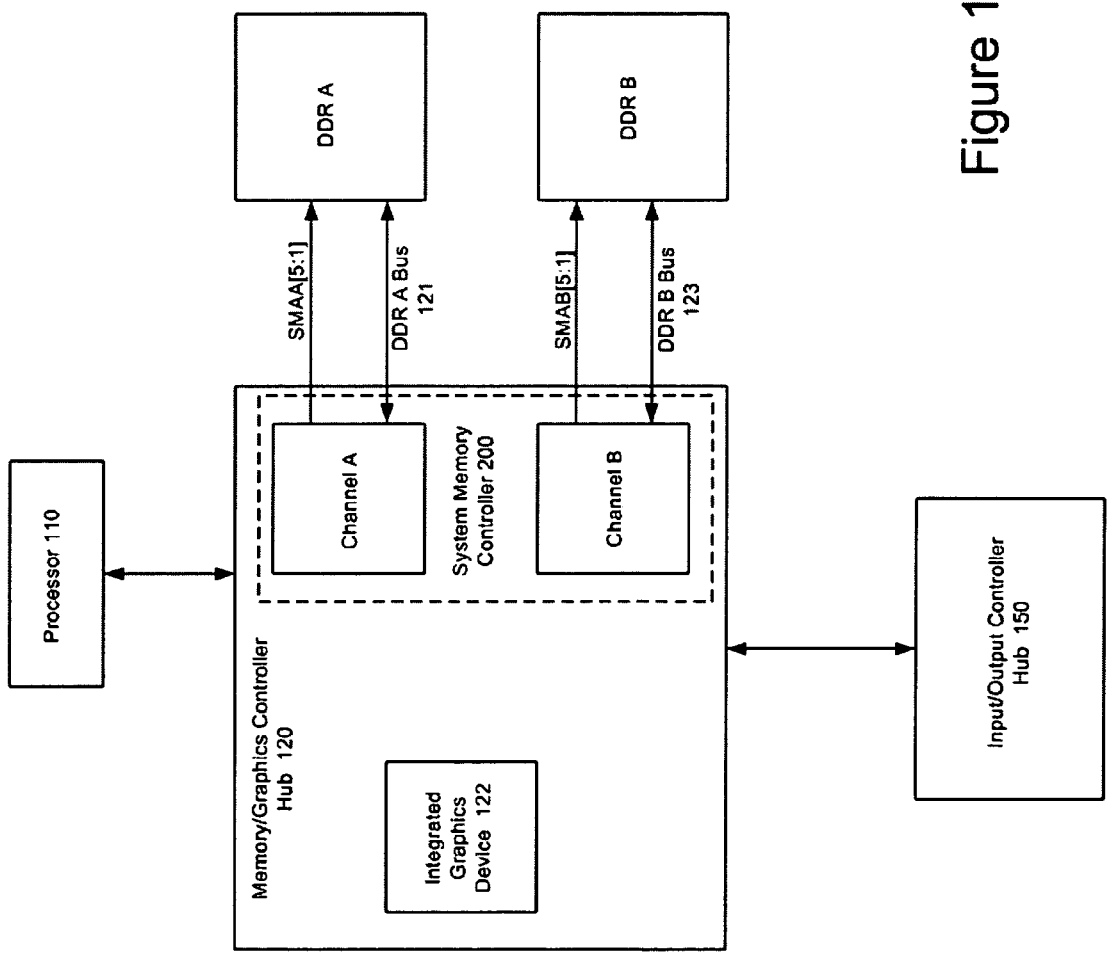
FIG. 1 is a block diagram of one embodiment of a computer system including a system memory controller coupled to a DDR memory.

FIG. 1 is a block diagram of one embodiment of a computer system including a system memory controller 200 coupled to a DDR memory A and a DDR memory B. The system memory controller 200 is included in a memory/graphics controller hub 120. The graphics/memory controller hub 120 also includes an integrated graphics device 122. A processor 110 is coupled to the memory/graphics controller 120. An input/output controller hub 150 is also coupled to the hub 120.

The system memory controller 200 provides for a channel A interface and a channel B interface. The channel interfaces A and B are coupled to DDR A and DDR B, respectively. The memory controller 200 is coupled to the DDR A device via a DDR A bus 121 that includes system memory address A (SMAA) lines [12:0] as well as a chip select signal 127 (not shown) and a clock signal 125 (not shown). The memory controller 200 also provides a second copy of SMAA lines [5:1] to the DDR A device. Similarly, the memory controller 200 is coupled to the DDR B device via a DDR B bus 123 that includes system memory address B (SMAB) lines [12:0] as well as a chip select signal. The memory controller 200 also provides a second copy of SMAB lines [5:1] to the DDR B device.

Figure 2:
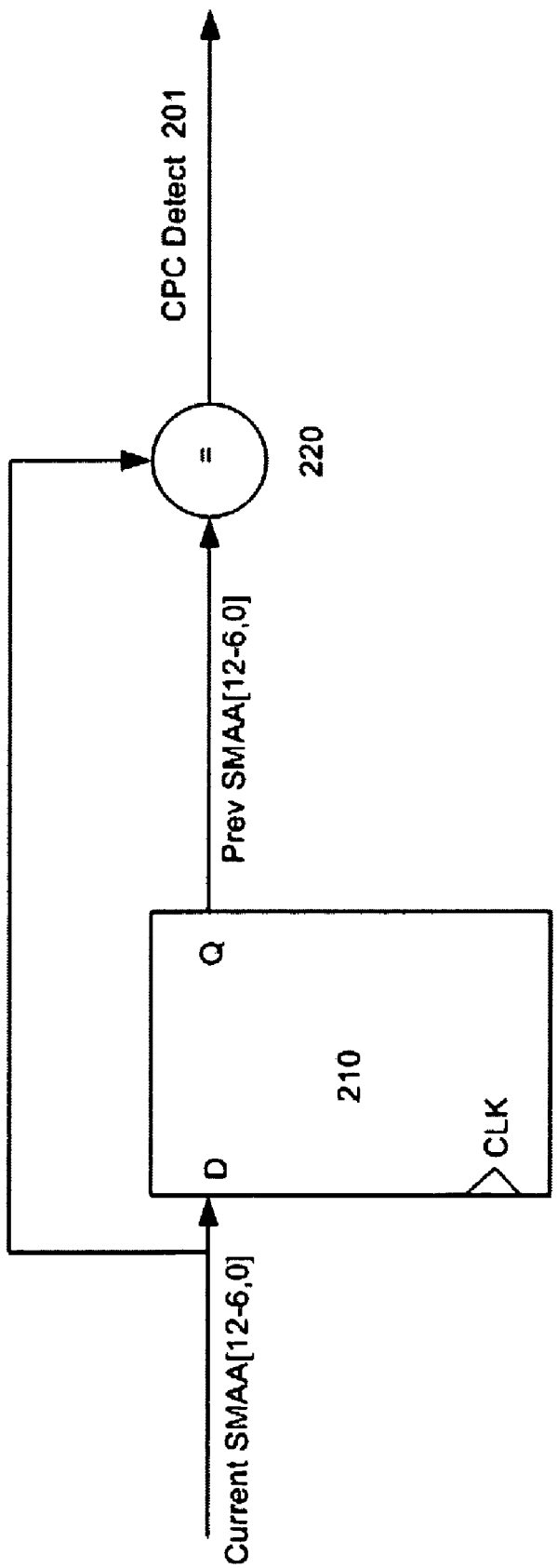
FIG. 2 is a block diagram of a command-per-clock detection unit.

FIG. 2 is a block diagram of a command-per-clock detection unit that is included in the memory controller 200. This command-per-clock detection unit is meant for use with channel A. A similar unit may be included for use with channel B. A latch 210 receives address lines SMAA[12:6, 0]. A compare circuit 220 compares the current values on the SMAA[12:6,0] lines with previous values of the SMAA[12:6,0] lines. If there is a match, then a command-per-clock (CPC) detect signal 201 is asserted. The assertion of the CPC detect signal 201 indicates to the memory controller 200 that conditions exist that allow the memory controller 200 to maintain the chip select signal in an asserted state. If there is no match, then the memory controller de-asserts the chip select signal for a clock period.

Figure 3:
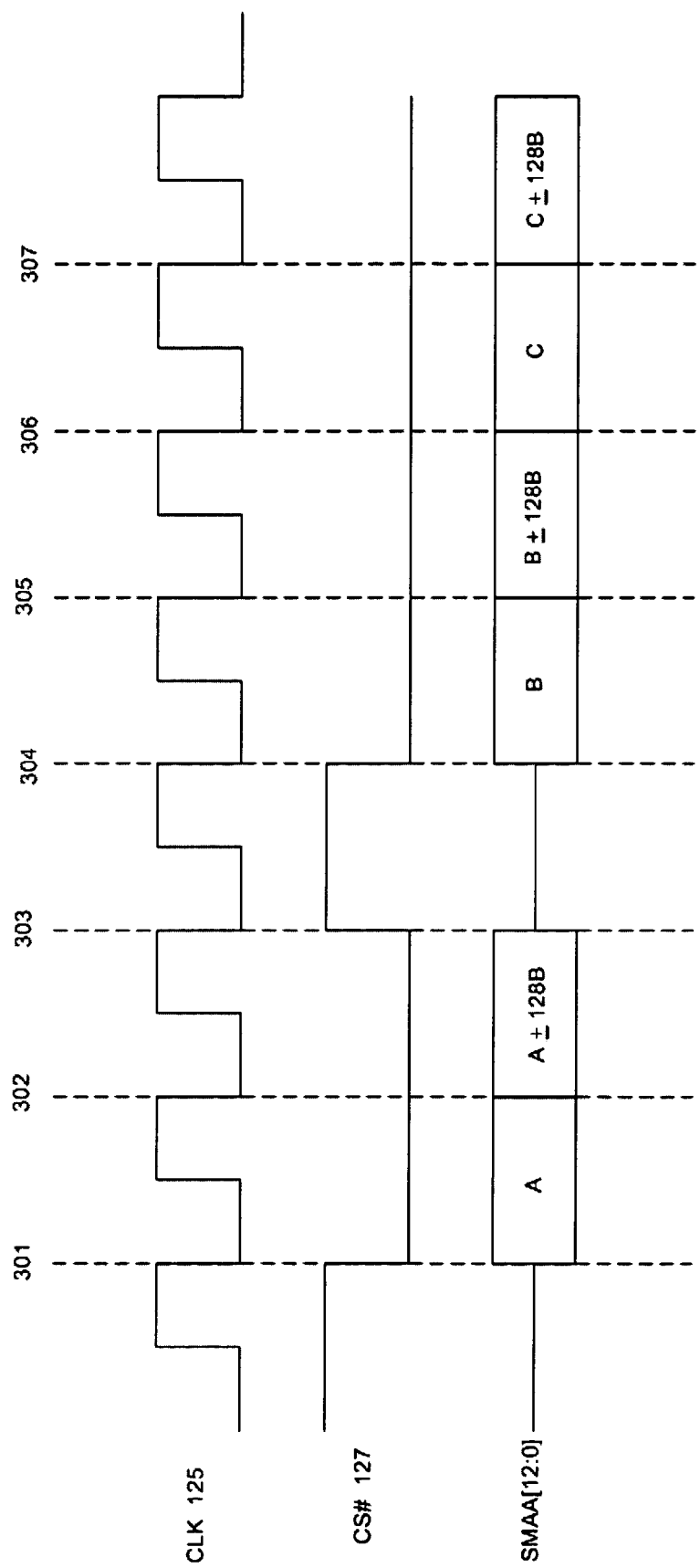
FIG. 3 is a timing diagram demonstrating an example transaction using command-per-clock.

FIG. 3 is a timing diagram demonstrating an example transaction using command-per-clock. At time 301, the chip select signal CS#127 is asserted (for this example, the chip select signal is considered to be asserted when at logical 0). Along with the assertion of the CS#127, a stride cycle A begins by placing address A on the SMAA[12:0] lines. At time 302 the second part of the stride cycle A occurs with an address of A plus or minus 128 Bytes. At this time, the command-per-clock detection unit determines whether conditions exist for a command-per-clock transaction. In this example, at time 303 the conditions do not exist and CS#127 is de-asserted for one clock period. A next stride cycle B begins at time 304. At time 305 a determination is made as to whether conditions exist for command-per-clock. For this example conditions do exist at time 306 and CS# remains asserted and cycle C begins immediately, with no wait state.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a first set of address line outputs;
   a second set of address line outputs that is a copy of a subset of the first set of address line outputs, the second set of address line outputs including at least 5 address line outputs;
   a command-per-clock detection unit to compare a current address with a previous address, the current and previous addresses including a subset of address bits corresponding to the first set of address line outputs less the address bits represented by the second set of address line outputs; and
   a chip select output to maintain a chip select line in an asserted state if the command-per-clock detection unit finds a match between the current and previous addresses.

2. The apparatus of claim 1, the first set of address lines including at least address lines [12:0].

3. The apparatus of claim 2, the second set of address lines including a copy of address lines [5:1].

4. The apparatus of claim 3, the command-per-clock detection unit to compare a current address including address bits [12:6,0] with a previous address including address bits [12:6,0].

5. The apparatus of claim 4, further comprising a second command-per-clock detection unit to provide command-per-clock control for a second memory interface.

6. A system, comprising:
   a memory controller including
      a first set of address line outputs,
      a second set of address line outputs that is a copy of a subset of the first set of address line outputs, the second set of address line outputs including at least 5 address line outputs,
      a command-per-clock detection unit to compare a current address with a previous address, the current and previous addresses including a subset of address bits corresponding to the first set of address line outputs less the address bits represented by the second set of address line output, and
      a chip select output to maintain a chip select line in an asserted state if the command-per-clock detection unit finds a match between the current and previous addresses; and
   a memory device coupled to the memory controller via a first and second set of address lines and the chip select line, the first and second address lines coupled to the first and second address line outputs.

7. The system of claim 6, the first set of address lines including at least address lines [12:0].

8. The system of claim 7, the second set of address lines including a copy of address lines [5:1].

9. The system of claim 8, the command-per-clock detection unit to compare a current address including address bits [12:6,0] with a previous address including address bits [12:6,0].

10. The system of claim 9, wherein the memory device is a DDR memory device.

11. The system of claim 10, further comprising a second memory device coupled to the memory controller.

12. The system of claim 11, the memory controller further including a second command-per-clock detection unit to allow command-per-clock chip select timing for the second memory device.

13. The system of claim 12, wherein the second memory device is a DDR memory device.

* * * * *